No. 851,486. PATENTED APR. 23, 1907.
J. BENNETT.
GAS BURNER FOR STOVES.
APPLICATION FILED MAY 22, 1906.

Witnesses
L. B. Bridges
R. W. Bishop

Inventor
John Bennett
By Davis & Davis
Attorneys

UNITED STATES PATENT OFFICE.

JOHN BENNETT, OF HUNTINGTON, WEST VIRGINIA.

GAS-BURNER FOR STOVES.

No. 851,486.　　　　Specification of Letters Patent.　　　Patented April 23, 1907.

Application filed May 22, 1906. Serial No. 318,251.

*To all whom it may concern:*

Be it known that I, JOHN BENNETT, a citizen of the United States of America, and a resident of Huntington, county of Cabell, State of West Virginia, have invented certain new and useful Improvements in Gas-Burners for Stoves, of which the following is a full and clear specification, reference being had to the accompanying drawings, in which—

Figure 1:
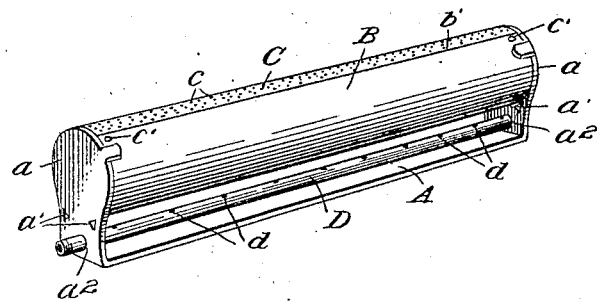
Figure 2:
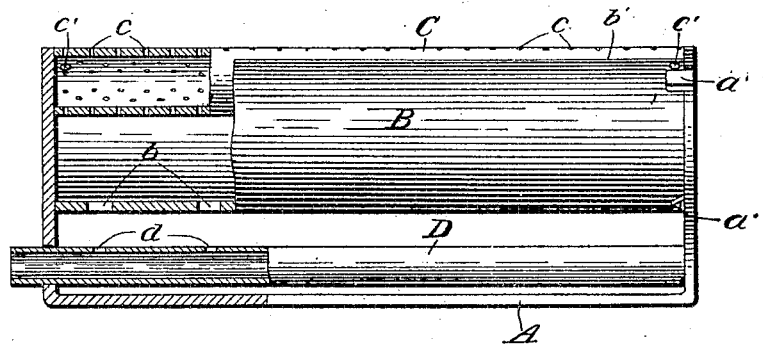
Figure 3:
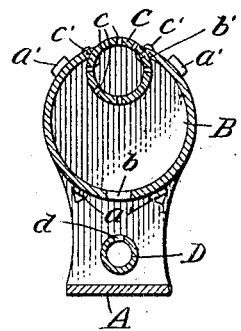

Figure 1 is a perspective view; Fig. 2 a side elevation partly in section; and Fig. 3 a vertical transverse section of my improved burner.

This invention has relation to that class of burners adapted for use in heating and cooking stoves, and especially to that type of burner where the gas and air are mixed in a chamber before issuing in jets at the burner openings, these burner openings extending the full length of the tubular mixing chamber so as to produce a practically continuous flame the full length of the burner.

To the accomplishment of this object and such others as may hereinafter appear, the invention consists of the parts and combination of parts hereinafter fully described, and particularly pointed out in the appended claims, reference being had to the accompanying drawings forming a part of this specification, in which the same reference characters designate like parts throughout the several views.

Referring to the drawings by reference-characters, A designates the base plate whose ends are bent upward to form end walls $a$ of the mixing chambers, the main mixing chamber B being attached to these upstanding end walls by means of suitable ears $a'$ formed integral with the said end walls.

The chamber B is substantially circular in cross-section and its ends are closed by the end walls $a$, and along its bottom is a series of holes $b$. Supported in the end walls $a$, below the chamber B, is the gas supply pipe D which is provided along its upper surface with a series of jet openings $d$, one of these openings being arranged directly in line with one of the openings $b$ in the mixing chamber, the openings $b$ being larger than the gas openings $d$.

The mixing chamber B is provided with a slot running the full length of its upper side, and this slot is covered by a tube C which engages the end walls $a$ and is enclosed within the chamber B except the narrow portion of its upper side which is exposed along the slot in the mixing chamber.

The tube C is provided with numerous perforations $c$ throughout its area, the perforations which are exposed along the upper side of the tube being the burner openings, and the remainder of these perforations open into the mixing chamber.

It will be observed that as the gas jets up into the main mixing chamber it carries with it the proper proportion of air, and the air and gas are commingled in the main mixing chamber B. From this main mixer the partially mixed air and gas is jetted into the final mixer C through the numerous fine holes in that portion of the tube exposed to the interior of the main mixer, and from this final mixing chamber the thoroughly mixed gas and air emerge from the burner openings. It will thus be observed that I obtain practically three mixing operations, each one more thorough than the preceding one, the first mixing being brought about by the arrangement of the openings $d$ and $b$, the second mixing taking place in the main mixer, and the final mixing being caused by requiring the mixed air and gas to pass through the numerous perforations in the tube C before issuance at the burner openings. By reason of this thorough mixing of the air and gas I obtain a perfect blue flame the full length of the burner, and this occurs even when the gas is turned on with full force. This complete combustion of the gas avoids the formation of fumes and smoke, thereby preventing contamination of the air in the room in which the burner is used. I also obtain the maximum of heat with a given quantity of gas. It will be observed also that the peculiar arrangement of the burner tube has the further advantage of preventing the flame from blowing down and burning the inside of the mixing chamber.

Having thus fully described my invention, what I claim and desire to secure by Letters Patent is:—

In a burner of the class set forth, a main mixing tube provided with openings in its bottom and a slot along its top, a gas supply pipe supported thereunder and provided with jet openings coincident with the openings therein, and a final mixer consisting of a numerously perforated tube enclosed within the main mixer except along its upper surface where it is exposed through the slot in the main mixing tube, substantially as and for the purpose set forth.

In testimony whereof I hereunto affix my signature in the presence of two witnesses this 21st day of May 1906.

JOHN BENNETT.

Witnesses:
F. A. WEIDER,
S. C. HERMEN.